United States Patent
Keyser

(10) Patent No.: US 11,360,760 B2
(45) Date of Patent: *Jun. 14, 2022

(54) SYSTEMS AND METHODS FOR VERSIONING A CLOUD ENVIRONMENT FOR A DEVICE

(71) Applicant: Citrix Systems, Inc., Fort Lauderdale, FL (US)

(72) Inventor: Charles Keyser, Fort Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/842,317

(22) Filed: Apr. 7, 2020

(65) Prior Publication Data

US 2020/0233656 A1 Jul. 23, 2020

Related U.S. Application Data

(63) Continuation of application No. 15/878,892, filed on Jan. 24, 2018, now Pat. No. 10,620,934.

(51) Int. Cl.
*G06F 8/65* (2018.01)
*G06F 8/71* (2018.01)
(Continued)

(52) U.S. Cl.
CPC .............. *G06F 8/65* (2013.01); *G06F 8/71* (2013.01); *G06F 9/547* (2013.01); *G06F 16/128* (2019.01);
(Continued)

(58) Field of Classification Search
CPC ..... G06F 8/60; G06F 8/65; G06F 8/71; G06F 9/547; G06F 16/128; G06F 17/30088;
(Continued)

(56) References Cited

U.S. PATENT DOCUMENTS

2009/0276771 A1* 11/2009 Nickolov et al. ....... H04L 67/34
717/177
2011/0282995 A1* 11/2011 Gass et al. ................ G06F 8/65
709/226
(Continued)

OTHER PUBLICATIONS

Final Office Action for U.S. Appl. No. 15/878,892 dated Sep. 19, 2019.
(Continued)

*Primary Examiner* — Wei Y Zhen
*Assistant Examiner* — Mohammed N Huda
(74) *Attorney, Agent, or Firm* — Foley & Lardner LLP

(57) ABSTRACT

Disclosed embodiments describe systems and methods for versioning a cloud environment for a device. A versioning system can store a snapshot of a first version of an environment of a device for using a cloud provider of a plurality of cloud providers. The environment can include one or more resource template files and one or more deployment application programming interfaces (APIs) for the cloud provider. The versioning system can receive a request to automatically deploy a second version of the environment for the device. A snapshot of the second version of the environment can include at least one second resource template file different than the one or more resource template files of the snapshot of the first version of the environment. The versioning system can automatically deploy the second version of the environment responsive to the request.

20 Claims, 6 Drawing Sheets

(51) Int. Cl.
  *H04L 67/306* (2022.01)
  *H04L 67/00* (2022.01)
  *G06F 9/54* (2006.01)
  *H04L 67/10* (2022.01)
  *G06F 16/11* (2019.01)
  *H04L 67/1097* (2022.01)
  *G06F 8/60* (2018.01)

(52) U.S. Cl.
  CPC .......... *H04L 67/10* (2013.01); *H04L 67/1097* (2013.01); *H04L 67/306* (2013.01); *H04L 67/34* (2013.01); *G06F 8/60* (2013.01)

(58) Field of Classification Search
  CPC ... H04L 67/10; H04L 67/1097; H04L 67/306; H04L 67/34
  USPC .......................................... 717/169
  See application file for complete search history.

(56) References Cited

U.S. PATENT DOCUMENTS

| | | |
|---|---|---|
| 2017/0041192 A1 | 2/2017 | Walls et al. |
| 2018/0004509 A1 | 1/2018 | Narasimhan et al. |
| 2019/0163763 A1* | 5/2019 | Pandey et al. ............ G06F 8/71 |

OTHER PUBLICATIONS

International Search Report and Written Opinion for Int. Appl. No. PCT/US2019/012887, dated Apr. 12, 2019.
Non-Final Office Action for U.S. Appl. No. 15/878,892 dated Mar. 14, 2019.
Notice of Allowance for U.S. Appl. No. 15/878,892 dated Dec. 11, 2019.
Australian Examination Report on AU Appl No. 2019211959 dated Nov. 11, 2020.
Examination Report on CA Appl. No. 3088985 dated Aug. 3, 2021.

* cited by examiner

SYSTEMS AND METHODS FOR VERSIONING A CLOUD ENVIRONMENT FOR A DEVICE

CROSS-REFERENCE TO RELATED APPLICATION

This patent application is a continuation of, and claims priority to and the benefit of U.S. patent application Ser. No. 15/878,892, titled "SYSTEMS AND METHODS FOR VERSIOMIMG A CLOUD ENVIRONMENT FOR A DEVICE," and filed Jan. 24, 2018, the contents of all of which are hereby incorporated herein by reference in its entirety for all purposes.

FIELD OF THE DISCLOSURE

The present application generally relates to systems and methods for versioning a cloud environment for a device. In particular, the present application relates to systems and methods for simplifying and abstracting specific deployment protocols and application programming interfaces (APIs) to allow a user to easily create and save versions of a cloud computing environment.

BACKGROUND OF THE DISCLOSURE

Cloud service providers make software and hardware tools available for individuals and organizations who require access to such tools. Generally, any combination of software and hardware, including virtualized hardware, provided by a cloud service can be referred to as a cloud environment. A user may wish to modify some aspects of a cloud environment over time. The user may also wish to have the ability to revert to an earlier version of the cloud environment at a later time, or may wish to migrate the cloud environment to a different cloud provider. However, version control and migration between cloud providers can require extensive knowledge of the particular deployment protocols, application programming interfaces (APIs), and other programmatic details, which unsophisticated users may not understand.

BRIEF SUMMARY OF THE DISCLOSURE

Existing solutions for versioning a cloud computing environment couple a traditional versioning system, such as Git, with versioning of templates. The templates may be templates provided by a cloud service provider. However, using such a versioning system with templates specific to a particular cloud service provider may require intimate knowledge of the specific cloud provider deployment protocols and application programming interfaces (APIs) in order to create profiles to deploy to the cloud. This disclosure describes techniques that can allow a user to setup instances of a cloud environment manually, and then create an image of the cloud environment from that infrastructure. Further, this disclosure describes techniques for creating a mapping between different cloud provider's services, which can allow a user to migrate a cloud environment between two or more different cloud providers, without having to manually convert templates or processes to complete the conversion process.

Learning to version a deployment of an instance of a cloud environment with different cloud providers requires knowledge of their respective deployment APIs and knowledge of any resource template files or other files that describe resources. In addition, knowledge of specific versioning software and administrative tools to use programmatic deployment and management on a cloud provider's environment may also be required.

However, using a versioning system that can interact directly with the user's environment with a cloud provider, as described in this disclosure, can allow less sophisticated users (e.g., individuals and small companies) the ability to maintain a history of their cloud environments over time, and to revert options, settings, or other parameters for their cloud infrastructure over time. Thus, this disclosure provides solutions to the problems identified above by allowing a user with limited programming knowledge to setup a cloud environment and to take a snapshot of the cloud environment. The snapshot of the cloud environment can be versioned, thereby allowing the user to return to a specific state of the cloud environment if needed. The user can also keep track of changes between different versions of the cloud environment and can easily apply changes to the current cloud environment. Once the user has setup a cloud environment, the user can save the cloud environment to a versioning component of the system to save changes or to change the environment to previous state. Thus, the systems and methods of this disclosure can allow a user to perform the operations needed in order to keep a record of cloud infrastructure and to return to previous states if necessary without having to interact with a cloud service provider programmatically, which may be challenging for a less sophisticated user.

In some embodiments, the systems and methods of this disclosure can make use of a generic template that can be captured in a snapshot of any cloud environment regardless of the cloud service provider. Such a template can be sufficiently generic to allow for mappings between the deployment protocols and APIs of different cloud providers. Thus, the system can also serve as a possible migration tool for migrating a cloud environment between cloud providers.

One aspect of this disclosure is directed to a method for versioning a cloud environment for a device. The method can include storing, by a versioning system, a snapshot of a first version of an environment of a device for using a cloud provider of a plurality of cloud providers. The environment can include one or more resource template files and one or more deployment application programming interfaces (APIs) for the cloud provider. The versioning system can store a plurality of snapshots of versions of the environment. The method can include receiving, by the versioning system, a request to automatically deploy a second version of the environment for the device. A snapshot of the second version of the environment can include at least one second resource template file different than the one or more resource template files of the snapshot of the first version of the environment. The method can include automatically deploying, by the versioning system responsive to the request, the second version of the environment for the device to change the environment for the device to use the one or more resource template files and versions of the deployment API of the second version of the environment.

In some embodiments, the second version of the environment for the device can correspond to a change in at least one of: (i) versions of the one or more deployment APIs for the cloud provider or (ii) a format or syntax of the one or more resource template files used by the cloud provider. In some embodiments, the method further includes receiving the request to automatically deploy the second version of the environment for a second cloud provider of the plurality of cloud providers. In some embodiments, the method further includes automatically deploying the second version of the environment to change the environment for the device from using the cloud provider to using the second cloud provider.

In some embodiments, the method further includes identifying at least one resource template file included in the first version of the environment that is not included in the second version of the environment. The method can also include deallocating, from the first version of the environment, the at least one resource template file. In some embodiments, the method further includes identifying at least one resource template file included in the second version of the environment that is not included in the first version of the environment. The method can also include allocating, to the first version of the environment, the at least one resource template file.

In some embodiments, each resource template file of the one or more resource template files includes one or more values of parameters of a respective resource to be deployed via the cloud provider. In some embodiments, the one or more resource template files of the first version of the environment have one of a different format or syntax than the one or more resource templates of the second version of the environment.

In some embodiments, the one or more resource template files of each of the first version of the environment and the second version of the environment have one of a common format or syntax for deploying to the plurality of cloud providers. In some embodiments, the method further includes modifying the one or more resource template files to change one of the common format or syntax to a format or syntax supported by the cloud provider.

Another aspect of this disclosure is directed to a system for versioning a cloud environment for a device. The system can include a server including one or more processors, coupled to a memory, and configured to store a snapshot of a first version of an environment of a device for using a cloud provider of a plurality of cloud providers. The environment can include one or more resource template files and one or more deployment application programming interfaces (APIs) for the cloud provider. The server can store a plurality of snapshots of versions of the environment. The system also can include a versioning system executable on the server. The versioning system can be configured to receive a request to automatically deploy a second version of the environment for the device. A snapshot of the second version of the environment can include at least one second resource template file different than the one or more resource template files of the snapshot of the first version of the environment. The versioning system can also be configured to automatically deploy responsive to the request, the second version of the environment for the device to change the environment for the device to use the one or more resource template files and versions of the deployment API of the second version of the environment.

In some embodiments, the second version of the environment for the device can correspond to a change in at least one of: (i) versions of the one or more deployment APIs for the cloud provider or (ii) a format or syntax of the one or more resource template files used by the cloud provider. In some embodiments, the versioning system is further configured to receive the request to automatically deploy the second version of the environment for a second cloud provider of the plurality of cloud providers. In some embodiments, the versioning system is further configured to automatically deploy the second version of the environment to change the environment for the device from using the cloud provider to using the second cloud provider.

In some embodiments, the versioning system is further configured to identify at least one resource template file included in the first version of the environment that is not included in the second version of the environment, and deallocate, from the first version of the environment, the at least one resource template file. In some embodiments, the versioning system is further configured to identify at least one resource template file included in the second version of the environment that is not included in the first version of the environment, and allocate, to the first version of the environment, the at least one resource template file.

In some embodiments, each resource template file of the one or more resource template files includes one or more values of parameters of a respective resource to be deployed via the cloud provider. In some embodiments, the one or more resource template files of the first version of the environment have one of a different format or syntax than the one or more resource templates of the second version of the environment.

In some embodiments, the one or more resource template files of each of the first version of the environment and the second version of the environment have one of a common format or syntax for deploying to the plurality of cloud providers. In some embodiments, the server is further configured to modify the one or more resource template files to change one of the common format or syntax to a format or syntax supported by the cloud provider.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
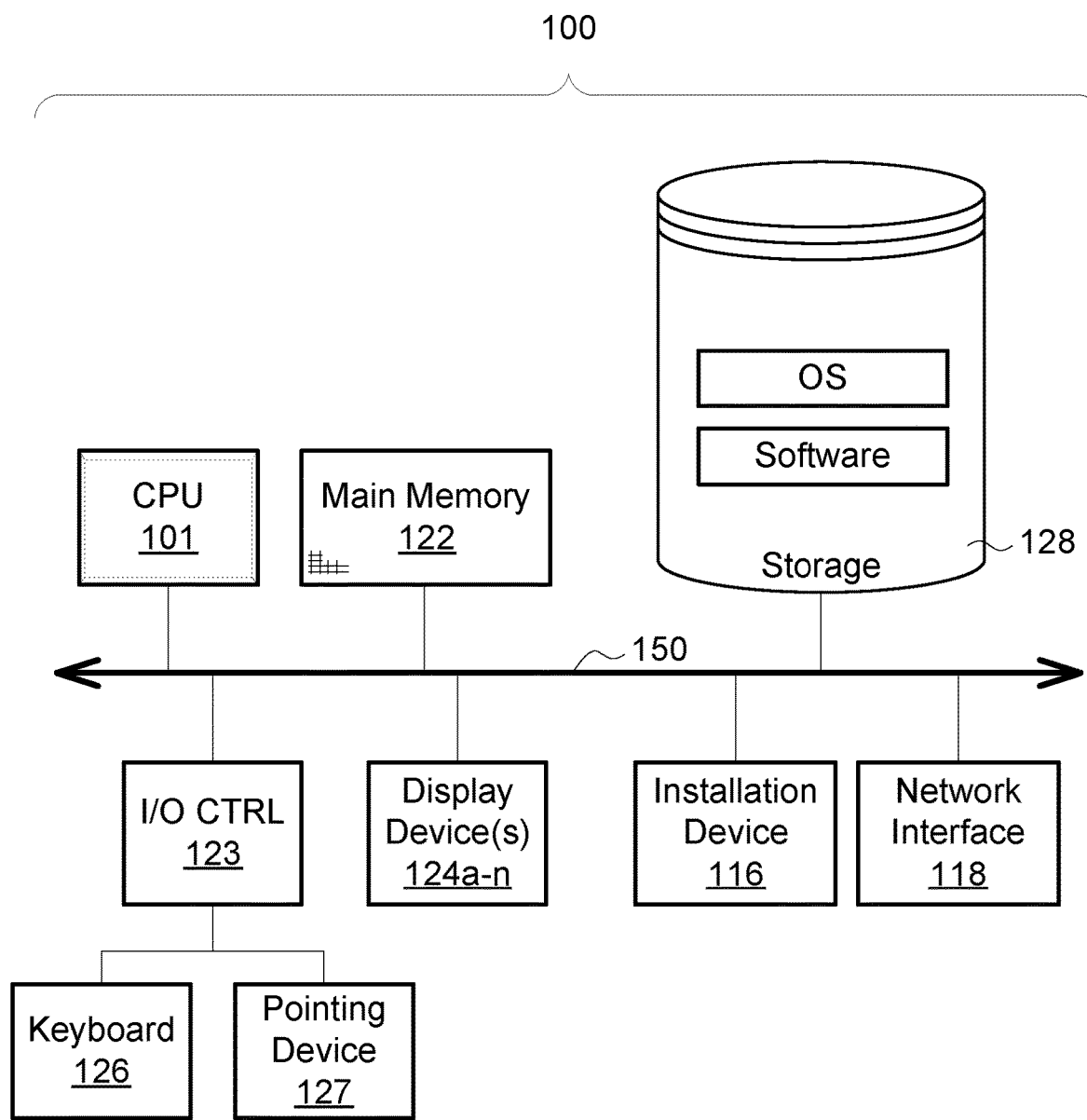
FIGS. 1A-1D are block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for versioning a cloud environment for a device.

A. Computing Environment

Figure 1B:
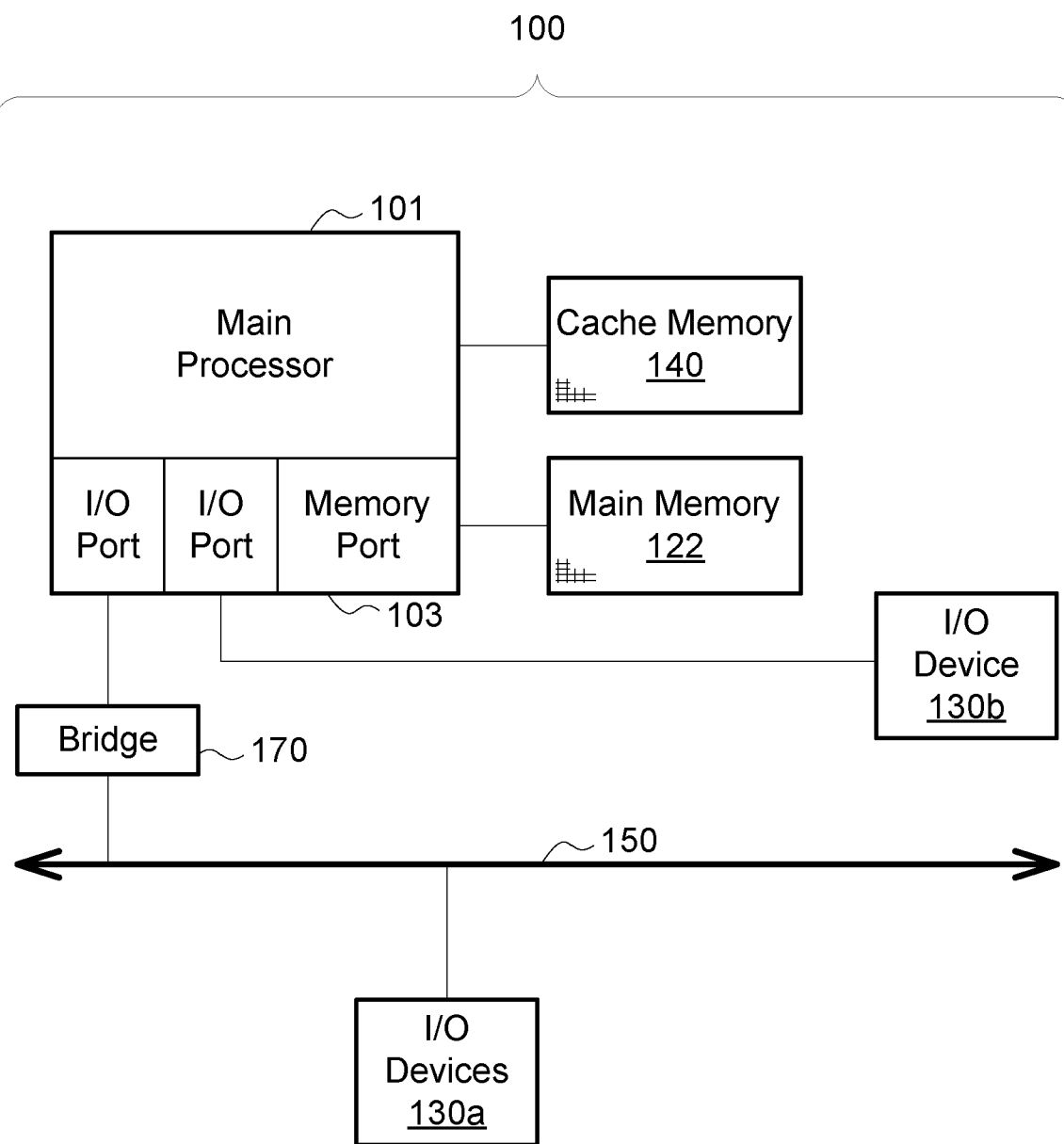

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101. In some embodiments, the input/output devices 130a-130b can include audio output devices, such as a speaker, headphones, or an audio output port configured to communicatively couple with an external audio output device.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
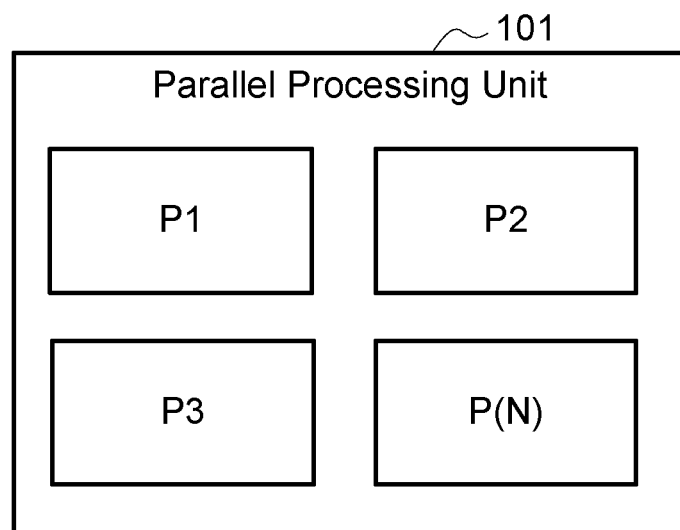

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
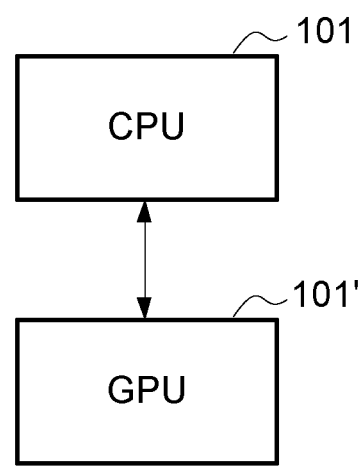

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Versioning a Cloud Environment for a Device

Existing solutions for versioning a cloud computing environment couple a traditional versioning system, such as Git, with versioning of templates. The templates may be templates provided by a cloud service provider. However, using such a versioning system with templates specific to a particular cloud service provider may require intimate knowledge of the specific cloud provider deployment protocols and application programming interfaces (APIs) in order to create profiles to deploy to the cloud. This disclosure describes techniques that can allow a user to setup instances of a cloud environment manually, and then create an image of the cloud environment from that infrastructure. Further, this disclosure describes techniques for creating a mapping between different cloud provider's services, which can allow a user to migrate a cloud environment between two or more different cloud providers, without having to manually convert templates or processes to complete the conversion process.

Learning to version a deployment of an instance of a cloud environment with different cloud providers requires knowledge of their respective deployment APIs and knowledge of any resource template files or other files that describe resources. In addition, knowledge of specific versioning software and administrative tools to use programmatic deployment and management on a cloud provider's environment may also be required.

However, using a versioning system that can interact directly with the user's environment with a cloud provider, as described in this disclosure, can allow less sophisticated users (e.g., individuals and small companies) the ability to maintain a history of their cloud environments over time, and to revert options, settings, or other parameters for their cloud infrastructure over time. Thus, this disclosure provides solutions to the problems identified above by allowing a user with limited programming knowledge to setup a cloud environment and to take a snapshot of the cloud environment. The snapshot of the cloud environment can be versioned, thereby allowing the user to return to a specific state of the cloud environment if needed. The user can also keep track of changes between different versions of the cloud environment and can easily apply changes to the current cloud environment. Once the user has setup a cloud environment, the user can save the cloud environment to a versioning component of the system to save changes or to change the environment to previous state. Thus, the systems and methods of this disclosure can allow a user to perform the operations needed in order to keep a record of cloud infrastructure and to return to previous states if necessary without having to interact with a cloud service provider programmatically, which may be challenging for a less sophisticated user.

In some embodiments, the systems and methods of this disclosure can make use of a generic template that can be captured in a snapshot of any cloud environment regardless of the cloud service provider. Such a template can be sufficiently generic to allow for mappings between the deployment protocols and APIs of different cloud providers. Thus, the system can also serve as a possible migration tool for migrating a cloud environment between cloud providers.

Figure 2:
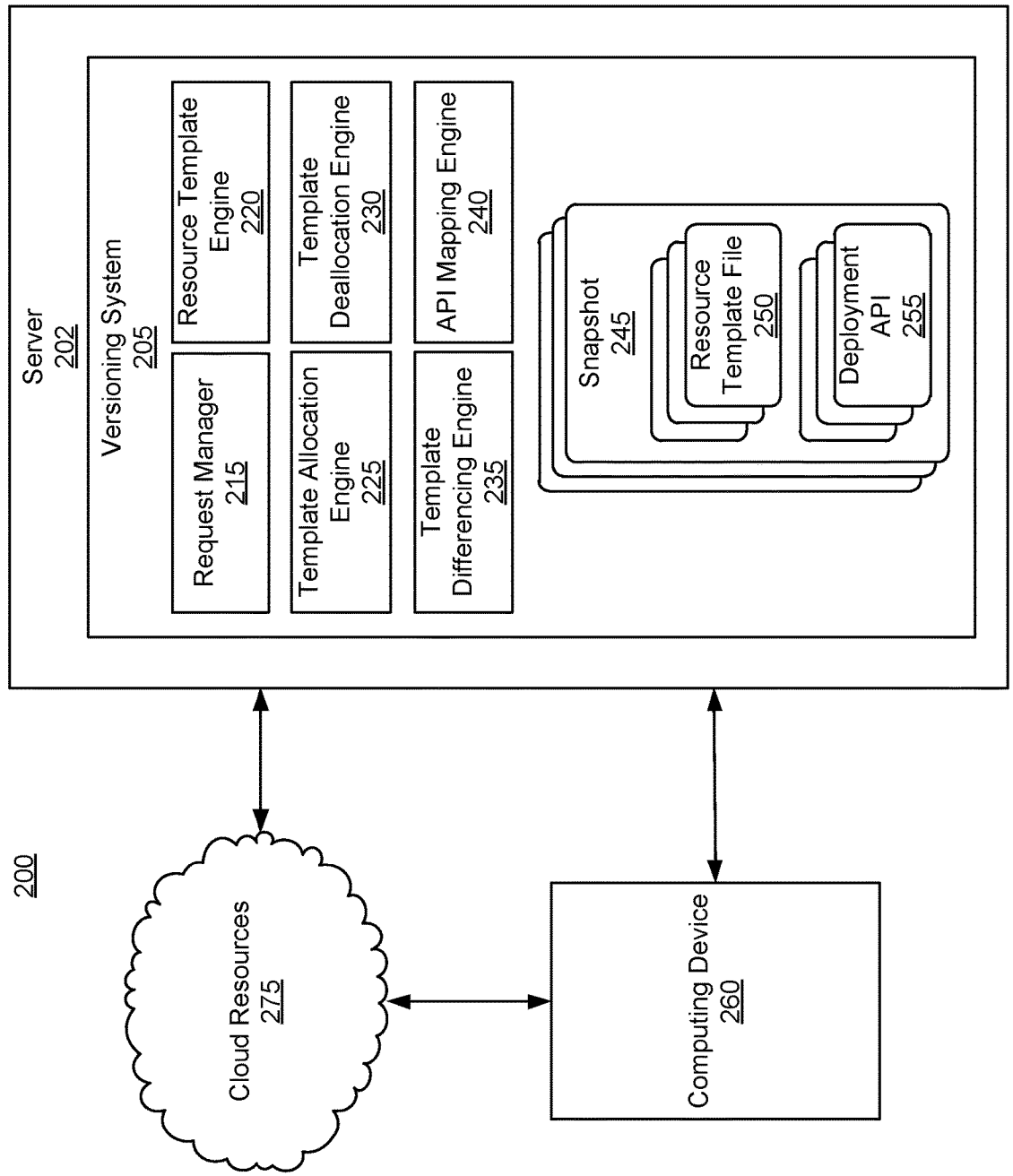
FIG. 2 is a block diagram of an embodiment of a system for versioning a cloud environment for a computing device.

FIG. 2 is a block diagram of an embodiment of a system 200 for versioning a cloud environment for a computing device. In brief summary, the system 200 includes a server 202, a computing device 260, and cloud resources 275. The server 202 executes a versioning system 205 having a request manager 215, a resource template engine 220, a template allocation engine 225, a template deallocation engine 230, a template differencing engine 235, and an API mapping engine 240. A plurality of snapshots 245 are also stored by the versioning system 205 executing on the server 202. Each snapshot 245 includes resource template files 250 and deployment APIs 255.

As shown in FIG. 2, the server 202, the computing device 260, and the cloud resources 275 are all capable of communicating with one another. In various embodiments, each of the above-mentioned elements or entities of the system 200 can be implemented in hardware, software, or a combination of hardware and software. In some embodiments, each component of the system 200 may be implemented using the hardware or a combination of the hardware or software detailed above in connection with FIGS. 1A-1D. For instance, in some embodiments, the versioning system 205, including the request manager 215, the resource template engine 220, the template allocation engine 225, the template deallocation engine 230, the template differencing engine 235, and the API mapping engine 240, can include any application, program, library, script, task, service, process or any type and form of executable instructions executing on hardware of the server 202. The hardware can include circuitry such as one or more processors in one or more embodiments. Communication between the server 202, the computing device 260, and the cloud resources 275 can take place over any type or form of network. For example, such communications can be carried out via any type of network capable of supporting communications between the server 202, the computing device 260, and the cloud resources 275. In some embodiments, these communications can be performed via any of a local-area network (LAN) (e.g., a company Intranet), a metropolitan area network (MAN), or a wide area network (WAN) (e.g., the Internet). It should also be understood that, while shown as separate components for illustrative purposes in FIG. 2, certain functionality described below in connection with the server 202, the versioning system 205 and its components, the computing device 260, and the cloud resources 275 could be combined such that the functionality of two or more of these elements depicted in FIG. 2 may be implemented by a single device.

In greater detail, the system 200 can be used to facilitate versioning of one or more cloud environments used by or running on the computing device 260. The cloud environments can include any combination of hardware, software, or virtualized infrastructure included in the cloud resources 275. Such hardware, software, and virtualized infrastructure may be provided as a service by one or more cloud providers, such as Amazon Web Services provided by Amazon.com Corporate LLC. Thus, it should be understood that such cloud providers themselves, as well as any systems, platforms, applications, services, tools, or other resources they provide to the computing device 260 as part of a cloud environment, also can be included in the cloud resources 275.

Generally, the resources provided by a cloud provider to allow a user of the computing device 260 to implement a cloud environment may be deployed according to a set of deployment protocols or APIs that are specific to the particular cloud provider. Interacting directly with these deployment protocols and APIs can require a level of programming knowledge that many users may not possess. In some embodiments, each cloud provider may help to facilitate deployment of its cloud resources 275 by abstracting some of the programmatic details, for example through a console or other application that can be accessed remotely by a user of the computing device 260. However, such consoles typically do not provide a mechanism by which a user can save a version of a deployed cloud environment as it exists at a particular point in time. Furthermore, such consoles also typically do not provide any mechanism to allow a user to migrate a deployed cloud environment to a different cloud provider. Thus, lacking the detailed programmatic knowledge of the deployment protocols and APIs for each cloud provider, a user of the computing device 260 would generally be unable to implement versioning or migration of a cloud environment.

The versioning system 205 executing on the server 202 can help to resolve these problems by easily allowing a user of the computing device 260 to save or store any number of versions of any number of cloud environments provided by any number of cloud providers. In addition, the versioning system 205 can also allow the user of the computing device 260 to easily migrate a given cloud environment from one cloud provider to another, even if the two cloud providers use different deployment protocols, and even if the user is unfamiliar with these protocols.

In some embodiments, the request manager 215 can be configured to receive a request from the computing device 260 relating to the storage or manipulation of a particular cloud environment that includes any combination of the cloud resources 275. For example, the cloud environment may generally include any computing resources and associated functionality implemented by hardware, software, or virtualized infrastructure in the cloud resources 275, and provided by a cloud provider. One such example of a request relating to a cloud environment is a request to store a current version of a cloud environment. In some embodiments, upon receipt of such a request by the request manager 215, the resource template engine 220 can be configured to collect, retrieve, or generate one or more resource templates associated with the cloud environment. For example, the resource template engine 220 can retrieve resource templates either from the cloud resources 275 or from the computing device 260. A resource template can include any information relating to any computing resource (e.g., a virtualized computing device, a software application, an operating system, a network service, etc.) included in the cloud environment. For example, the resource template for a given resource can include identification information for the respective resource, network address information for the resource, and values for any parameters associated with the resource. For each resource of the cloud environment, the resource template engine 220 can store a respective resource template file 250 that includes any of the information described above relating to the resource.

In addition, the resource template engine 220 can also collect, retrieve, or generate one or more deployment APIs associated with the cloud environment. Generally, a deployment API can be any set of instructions or deployment protocols required to invoke or otherwise use or access one or more resources. The resource template engine 220 can store this information in one or more deployment APIs 255. In some embodiments, the resource template engine 220 can store the resource template files 250 and the deployment APIs 255 as a respective snapshot 245. The snapshot 245 also can include other information such as a unique identifier for the version of the cloud environment that corresponds to the snapshot 245, or a date and/or time at which the snapshot 245 was created. Thus, the snapshot 245 may represent the entire cloud computing environment that the computing device 260 requested to have versioned. In some embodiments, a snapshot 245 can be maintained by the versioning system 205 for any length of time, and other snapshots 245 can also be created over time (e.g., in response to later requests from the computing device 260 to store a version of a cloud environment).

In some embodiments, the computing device 260 may issue a request to store a snapshot 245 of a cloud environment upon determining that the environment meets some criteria for deployment success, such as adequately performing a desired functionality. Over time, the user of the computing device 260 may make changes to the cloud environment. In some embodiments, after determining that the changes are acceptable, the computing device 260 can issue another request to save or store an updated snapshot 245 corresponding to the updated version of the cloud environment. Thus, if a later change to the cloud environment is determined to be undesirable, information corresponding to an earlier successful version of the cloud environment still can be accessed in the form of a respective snapshot 245.

To revert to a different version of a cloud environment, the computing device 260 can send a corresponding request to the versioning system 205. The request manager 215 can receive the request. In some embodiments, the request can include an indication of the particular snapshot 245 corresponding to the version of the cloud environment that is to be reverted to. In some other embodiments, the request can indicate a day or time of the version of the cloud environment that should be reverted to, and the corresponding snapshot 245 can be identified by referencing the day or time information stored in the snapshots.

The template allocation engine 225, the template deallocation engine 230, and the template differencing engine 235 can be configured to facilitate reversion to the selected cloud environment after the corresponding snapshot 245 has been identified. For example, in some embodiments the template differencing engine 235 can determine a first set of current resource template files 250 corresponding to a currently deployed version of the cloud environment (e.g., by examining the template resource files currently deployed in the cloud resources 275 to implement the current version of the cloud environment, or by examining the template resource files 250 that exist in a snapshot 245 that corresponds to the currently deployed version of the cloud environment), as well as a second set of resource template files 250 included in the snapshot 245 that corresponds to the version of the cloud environment that is to be reverted to. Then, the template differencing engine 235 can determine the differences between the template resource files 250 included in the two sets of resource template files. Stated another way, the template differencing engine 235 can determine which template resource files 250 are included in both sets, and which are included in only one set.

The template allocation engine 225 can be configured to allocate each template resource file 250 that is included in the snapshot 245 corresponding to the version of the cloud environment that is to be reverted to but not included in the currently deployed cloud environment. For example, the template allocation engine 225 can allocate a template resource file 250 by sending the template resource file 250 to the cloud resources 275 along with a set of instructions (e.g., formatted according to a corresponding one of the deployment APIs 255) to have the corresponding resources activated. Similarly, the template deallocation engine 230 can be configured to deallocate each template resource file 250 that is included in the currently deployed cloud environment but is not included in the snapshot 245 that corresponds to the version of the cloud environment that is to be reverted to but not. In some embodiments, the template deallocation engine 230 can deallocate a template resource file 250 by generating a set of instructions to cause the cloud resources 275 corresponding to the current cloud environment to disable or deactivate the respective resource, and by transmitting the set of instructions to the respective cloud resources 275. After the template allocation engine 225 has allocated each template resource file 250 included in the snapshot 245 of the version of the cloud environment that is to be reverted to, and the template deallocation engine 230 has deallocated each template resource file 250 of the previously deployed cloud environment that is not included in the snapshot 245 of the cloud environment that is to be reverted to, the currently deployed cloud environment will match the cloud environment represented by the snapshot 245 selected for the reversion, and the reversion is complete.

It should be understood that the template allocation engine 225 and the template deallocation engine 230 can both perform the functionality described above by using information found in the deployment APIs 255 of the selected snapshot 245. For example, to activate or deactivate a given resource, the template allocation engine 225 and the template deallocation engine 230 can generate one or more instructions formatted in a manner specified by the deployment APIs 255, and can transmit the one or more instructions to the cloud resources 275 that are. Thus, the user of the computing device 260 merely has to issue a reversion request indicating a particular snapshot 245, and versioning system 205 can implement the reversion. As a result, reversion can be achieved even if the user of the computing device 260 is not familiar with the programmatic details of the cloud provider that provides a particular cloud environment.

In some embodiments, the computing device 260 also can issue a request to the versioning system 205 to migrate a particular cloud environment from a first cloud provider to a second cloud provider. For example, this may be desirable in instances in which the first cloud provider increases its prices relative to the second cloud provider, or in instances in which the first cloud provider's offerings are inferior to those of the second cloud provider. As described above, it is often the case that the deployment protocols and APIs used by the first cloud provider may be different from those used by the second cloud provider. Thus, in conventional systems, a user must have knowledge of the programmatic details for both cloud providers in order to migrate a cloud environment from the first cloud provider to the second cloud provider, as the only alternative would be to set up a new cloud environment with the second cloud provider from scratch. However, upon receipt by the request manager 215 of a request to migrate a cloud environment from a first cloud provider to a second cloud provider, the versioning system 205 can be configured to automatically perform the migration.

In some embodiments, the API mapping engine 240 can facilitate the migration by creating and/or storing a mapping between the deployment protocols and APIs for the first cloud service and the deployment protocol and APIs for the second cloud service. While the first cloud service and the second cloud service may provide similar infrastructure and functionality, the particular deployment protocols and APIs used to invoke such infrastructure and functionality may differ. For example, to implement load balancing functionality, the first cloud service provider may require a first set of instructions formatted according to a first protocol, while the second cloud service provider may require a second set of instructions formatted according to a second protocol, different from the first protocol. The API mapping engine 240 can be configured to create and/or store a mapping between the first set of instructions required by the first cloud service and the second set of instructions required by the second cloud service. In this example, the API mapping engine can store an association between the first set of instructions and the second set of instructions. In some embodiments, the first set of instructions and the second set of instructions may be stored together in a data structure along with an indication that both sets of instructions correspond to load balancing functionality for their respective cloud providers. In some embodiments, such a data structure may also include additional sets of instructions for implementing load balancing functionality for additional cloud providers. Further, it should be understood that the API mapping engine 240 may also store similar mappings for sets of instructions relating to other functionality or provisioning of the cloud resources 275 across different cloud providers. In some embodiments, the API mapping engine 240 can store such a mapping between any number of instructions, services, or other functionalities across any number of cloud providers. Thus, when the request manager 215 receives a request from the computing device 260 to migrate a cloud environment from a first cloud provider to a second cloud provider, the migration may be achieved by using the template allocation engine 225 to allocate all of the resources corresponding to the cloud environment via the second cloud service according to the mapping determined by the API mapping engine 240. Then, the template deallocation engine 225 can deallocate all of the resources provided by the first cloud provider, and the migration of the cloud environment from the first cloud provider to the second cloud provider is complete.

Figure 3:
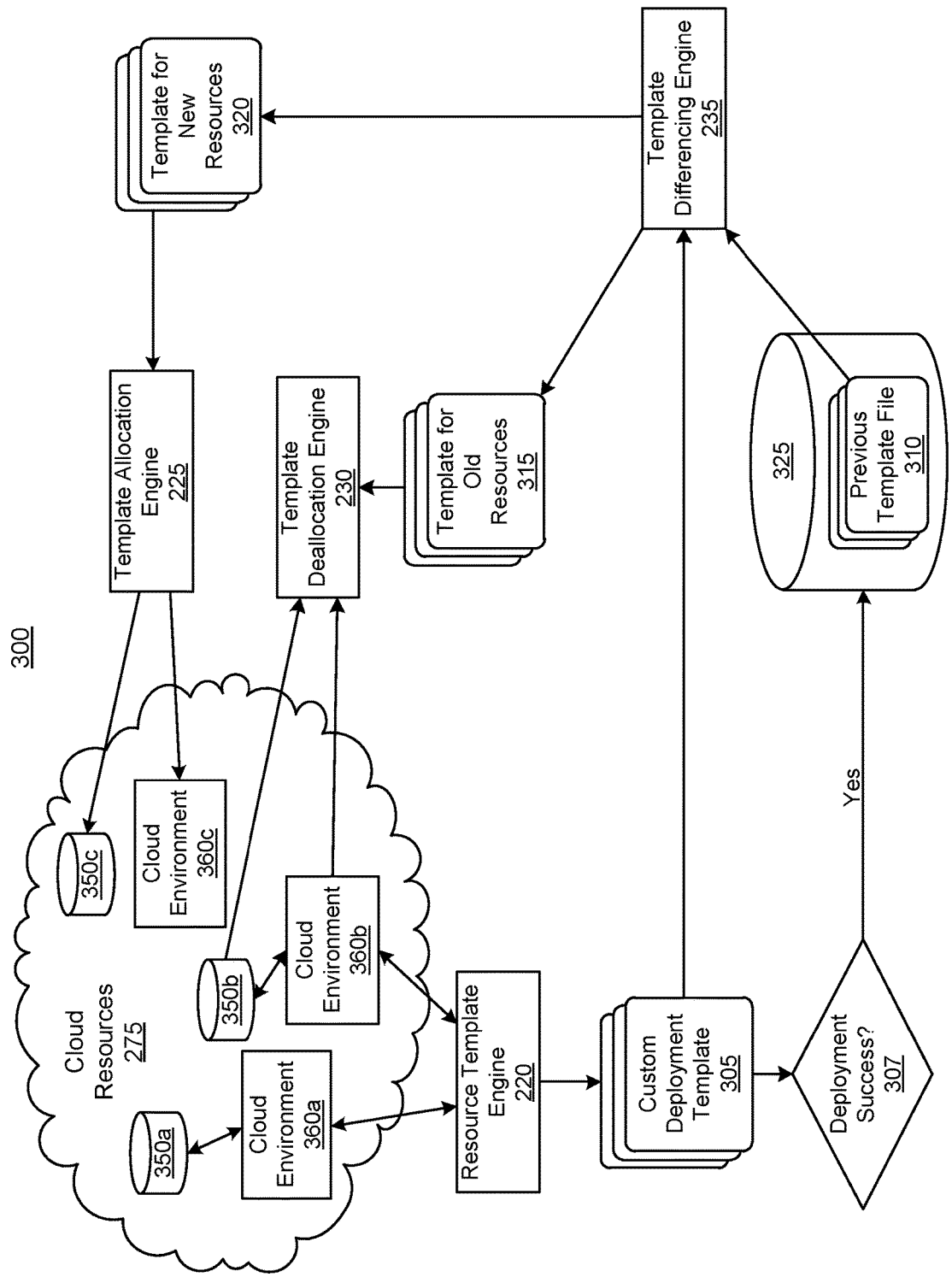
FIG. 3 is a diagram depicting the flow of information in an embodiment of the system shown in FIG. 2.

FIG. 3 is a diagram 300 depicting the flow of information in an embodiment of the system 200 shown in FIG. 2. Several of the components of the versioning system 205 of FIG. 2, such as the resource template engine 220, the template allocation engine 225, the template deallocation engine 230, and the template differencing engine 235, are shown in FIG. 3. The cloud resources 275 are also shown. Included within the cloud resources 275 are databases 350a-350c and respective cloud environments 360a-360c. In addition, FIG. 3 shows a plurality of custom deployment templates 305, previous template files 310, templates for old resources 315, and templates for new resources 320. It should be understood that each of the custom deployment templates 305, previous template files 310, templates for old resources 315, and templates for new resources 320 can be implemented as an instance of a resource template file 250 as shown in FIG. 2 and described above. However, for illustrative purposes, the templates of FIG. 3 are identified by different names and reference numerals.

The resource template engine 220 can receive one or more custom deployment templates 305 included in the cloud environment 360a. In some embodiments, the cloud environment 360a may be stored in the database 350A. Together, the custom deployment templates 305 can correspond to all of the resources included in the cloud environment 360a. At decision block 307, it can be determined whether the custom deployment templates 305 represent a successful deployment. Stated another way, because the custom deployment templates 305 correspond to the cloud environment 360a, the decision made at block 307 can relate to a determination of whether cloud environment 360a is successfully deployed. As described above, deployment success can be evaluated based on any of a number of different metrics, including whether the current cloud environment achieves a desired functionality. If the custom deployment templates 305 represent a successful deployment, they can be stored in the memory element 325 as previous template files 310. In some embodiments, these previous template files 310 can be thought of as the resource template files 250 associated with snapshots 245 that correspond to past versions of the cloud environment that have been saved and versioned in the versioning system 205, as shown in FIG. 2.

The template differencing engine 225 can receive the one or more custom deployment templates 305 as well as the previous template files 310, and can perform functionality similar to that described above in connection with FIG. 2. For example, the template differencing engine 235 can determine a degree of overlap between the custom deployment templates 305 and the previous template files 310. Stated another way, the template differencing engine 235 can determine which of the previous template files 310 are included in the custom deployment template 305, and which are not.

Those templates that are not included among the custom deployment templates 305 are identified by the template differencing engine 235 as templates for old resources 315, and are sent to the template deallocation engine 230. The template deallocation engine 230 then deallocates these templates for old resources 315, as described above. For example, the template deallocation engine 230 can extract the templates for old resources 315 from the cloud environment 360b and from the database 350b, such that the templates for old resources 315 are no longer included in the cloud resources 275. The directed arrows from the cloud environment 360b and the database 350b to the template deallocation engine 230 represent the deallocation of the resources that correspond to the templates for old resources 315 from an active cloud environment. Thus, in this example, the cloud environment 360b can represent an old version of a cloud environment that is being deallocated. In some implementations, the cloud environment 360b can be stored in the database 350b, as indicated by the arrow coupling the cloud environment 360b and the database 350b.

The set of templates that are included among the custom deployment templates 305 are identified by the template differencing engine 235 as templates for new resources 320, and are sent to the template allocation engine 225. The template allocation engine 225 then allocates these templates for new resources 320, as described above. For example, the template allocation engine 225 can transmit the templates for new resources 320 to the cloud environment 360c and the database 350c. The directed arrows from the template allocation engine 225 to the cloud environment 360c and the database 350c represent the allocation of the resources that correspond to the templates for new resources 320 in the active cloud environment. Thus, the old resources are deallocated and the new resources are allocated, such that the active cloud environment is successfully updated based on the custom deployment templates 305. As a result, the cloud environment 360c can represent a newly activated (i.e., currently active) cloud environment in the diagram 300 of FIG. 3.

Figure 4:
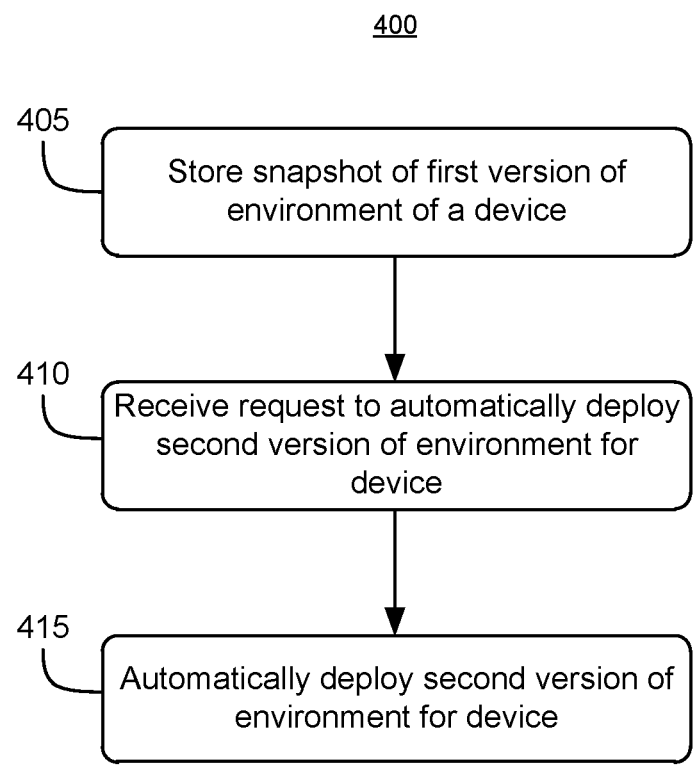
FIG. 4 is a flow diagram of an embodiment of a method for versioning a cloud environment for a computing device.

FIG. 4 is a flow diagram of an embodiment of a method 400 for versioning an environment for a computing device. In some embodiments, the method 400 can be performed by a versioning system such as the versioning system 205 shown in FIG. 2. In brief overview, the method 400 includes storing a snapshot of a first version of an environment of a device (step 405), receiving a request to automatically deploy a second version of the environment for the device (step 410), and automatically deploying the second version of the environment of the device (step 415).

Referring again to FIG. 4, the method 400 includes storing a snapshot of a first version of an environment of a device (step 405). In some embodiments, the device can be a computing device such as the computing device 260 shown in FIG. 2, and the environment can be a cloud environment included in the cloud resources 275. The environment can use or can be provided by a cloud provider of a plurality of cloud providers. Generally, the environment can include information corresponding to any computing resources, such as virtualized infrastructure, hardware, software application, or network functionality. In some embodiments, the environment can be stored as a snapshot that includes one or more resource template files, as well as one or more deployment APIs for the cloud provider. In some embodiments, the resource template files can correspond to the resources of the environment, and may include information such as identifications or network addresses of the respective resources, as well as values for any parameters that may be associated with the respective resources. The deployment APIs can describe the specific programmatic interfaces or protocols used to access, modify, enable, or disables the resources, according to the cloud provider. In some embodiments, the versioning system can also store a plurality of additional snapshots, each of which can correspond to a different respective version of the environment. Together, the plurality of snapshots can form a complete version history for the environment over time.

The method 400 includes receiving a request to automatically deploy a second version of the environment for the device (step 410). In some embodiments, a request manager such as the request manager 215 of the versioning system 205 shown in FIG. 2 can receive the request. The second version of the environment for the device can correspond to one of the plurality of other snapshots that is stored by the versioning system. For example, the second version of the environment may be an older version of the environment. The device can initiate the request based on a determination that the second version of the environment may be more desirable than the first version of the environment, for example due to better stability or performance of the second version of the environment with respect to the first version of the environment.

The method 400 also includes automatically deploying the second version of the environment of the device (step 415). The versioning system can automatically deploy the second version of the environment responsive to the request. In some embodiments, the environment may change as a result of deployment of the second version, based on one or more resource template files and versions of the deployment API for the second version of the environment. In some embodiments, deployment of the second version of the environment can be implemented on an incremental basis with respect to the first version of the environment. Stated another way, only those resources that are different across the first version of the environment and the second version of the environment may change as a result of deployment of the second version of the environment. In some embodiments, a differencing engine, an allocation engine, and a deallocation engine of the versioning system can be used to achieve such incremental implementation of the second version of the environment. For example, the differencing engine can be configured to determine the differences between the resource template files and deployment APIs of the first environment and those of the second environment. For resource template files and deployment APIs that are common to both the first version of the environment and the second version of the environment, no changes need be made. However, for resource template files that are included in only in the second version of the environment but not in the first version, the allocation engine can be configured to allocate corresponding resources as part of the deployment of the second version of the environment. Similarly, for resource template files that are included in only in the first version of the environment but not in the second version, the deallocation engine can be configured to deallocate corresponding resources as part of the deployment of the second version of the environment. After the resource files have been allocated and deallocated in this manner, deployment of the second version of the environment is complete.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   receiving, by one or more processors, a request to deploy a second snapshot of a second version of a computing environment to a cloud provider by using one or more application programming interfaces (APIs) that include one or more protocols to deploy the second snapshot to the cloud provider;
   comparing, by the one or more processors, a first snapshot of a first version of the computing environment to the second snapshot to identify at least one file within the second snapshot absent from the first snapshot, the at least one file including information relating to a computing resource of the computing environment;
   allocating, by the one or more processors, responsive to identifying that the at least one file within the second snapshot is absent from the first snapshot, the at least one file to the second version of the computing environment by including the at least one file in the second version; and
   deploying, by the one or more processors, in response to the request and according to the one or more APIs corresponding to the cloud provider, the second version of the computing environment by deployment of the at least one file allocated to the second version to the cloud provider.

2. The method of claim 1, further comprising identifying, by the one or more processors, based at least on the comparison, a second file included in the first version of the computing environment that is absent from the second version of the computing environment; and
   deallocating, by the one or more processors, the second file from the first version of the computing environment.

3. The method of claim 1, further comprising using, by the one or more processors, the one or more APIs corresponding to the cloud provider to deploy the second snapshot to the cloud provider.

4. The method of claim 1, further comprising using, by the one or more processors, one or more files of the second snapshot and the at least one file to deploy the second version of the computing environment to the cloud provider.

5. The method of claim 1, further comprising changing, by the one or more processors, the cloud provider to use the at least one files of the second version of the computing environment.

6. The method of claim 1, further comprising transmitting, by the one or more processors, one or more instructions to allocate the at least one file to the second version of the computing environment.

7. The method of claim 6, further comprising:
   allocating, by the one or more processors, the one or more resource files to the second computing environment according to the mapping between the first set of deployment APIs for the first cloud provider and the second set of deployment APIs for the second cloud provider; and
   deallocating, by the one or more processors, the one or more resource files from the first computing environment according to the mapping between the first set of deployment APIs for the first cloud provider and the second set of deployment APIs for the second cloud provider.

8. A system comprising:
   one or more processors, coupled to memory and configured to:
      receive a request to deploy a second snapshot of a second version of a computing environment to a cloud provider by using one or more application programming interfaces (APIs) that include one or more protocols to deploy the second snapshot to the cloud provider;
      compare a first snapshot of a first version of the computing environment to the second snapshot to identify at least one file within the second snapshot absent from the first snapshot, the at least one file including information relating to a computing resource of the computing environment;

allocate, responsive to identifying that the at least one file within the second snapshot is absent from the first snapshot, the at least one file to the second version of the computing environment by including the at least one file in the second version; and deploy, in response to the request and according to the one or more APIs corresponding to the cloud provider, the second version of the computing environment by deployment of the at least one file allocated to the second version to the cloud provider.

9. The system of claim 8, wherein the one or more processors are further configured to:
identify, based at least on the comparison, a second file included in the first version of the computing environment that is absent from the second version of the computing environment; and
deallocate the second file from the first version of the computing environment.

10. The system of claim 8, wherein the one or more processors are further configured to use the one or more APIs corresponding to the cloud provider to deploy the second snapshot to the cloud provider.

11. The system of claim 8, wherein the one or more processors are further configured to use one or more files of the second snapshot and the at least one file to deploy the second version of the computing environment to the cloud provider.

12. The system of claim 8, wherein the one or more processors are further configured to change the cloud provider to use the at least one files of the second version of the computing environment.

13. The system of claim 8, wherein the one or more processors are further configured to transmit one or more instructions to allocate the at least one file to the second version of the computing environment.

14. A method comprising:
receiving, by one or more processors, a request to deploy a second version of a computing environment to a cloud provider on which a first version of the computing environment is deployed;
identifying, by the one or more processors, from the request to deploy, a second snapshot of the second version of the computing environment;
comparing, by the one or more processors, a first snapshot of the first version of the computing environment to the second snapshot of the second version to identify a first file within the second snapshot absent from the first snapshot and a second file within the first snapshot absent from the second snapshot, the first file including information relating to a computing resource of the computing environment;
identifying, by the one or more processors, one or more deployment application programming interfaces (APIs) corresponding to the cloud provider;
generating, by the one or more processors, one or more first instructions to allocate the first file to the computing environment in accordance with the one or more APIs corresponding to the cloud provider;
generating, by the one or more processors, one or more second instructions to deallocate the second file from the computing environment in accordance with the one or more APIs corresponding to the cloud provider; and
deploying, by the one or more processors, the second version of the computing environment responsive to transmitting the one or more first instructions to allocate the first file to the computing environment and transmitting the one or more second instructions to deallocate the second file from the computing environment.

15. The method of claim 14, further comprising:
identifying, by the one or more processors, based at least on the comparison, the second file included in the first version of the computing environment that is absent from the second version of the computing environment; and
removing, by the one or more processors, the second file from the first version of the computing environment.

16. The method of claim 14, further comprising changing, by the one or more processors, the computing environment by adding the first file to the computing environment and removing the second file from the computing environment.

17. The method of claim 14, further comprising:
identifying, by the one or more processors, based at least on the comparison, the first file included in the second version of the computing environment that is absent from the first version of the computing environment; and
adding, by the one or more processors, the first file to the second version of the computing environment.

18. The method of claim 14, wherein transmitting the one or more first instructions to allocate the first file to the computing environment comprises transmitting the one or more first instructions to add the first file to the computing environment.

19. The method of claim 14, wherein transmitting the one or more second instructions to deallocate the second file from the computing environment comprises transmitting the one or more second instructions to remove the second file from the computing environment.

20. A method comprising:
maintaining, by one or more processors, a mapping between a first set of deployment application programming interfaces (APIs) for a first cloud provider and a second set of deployment APIs for a second cloud provider, the first set of deployment APIs including a first set of protocols for allocation or deallocation of one or more resource files for the first cloud provider and the second set of deployment APIs including a second set of protocols for allocation or deallocation of the one or more resource files for the second cloud provider;
generating, by the one or more processors, a first set of instructions to allocate the one or more resource files included in a snapshot of a first computing environment deployed on the first cloud provider to a second computing environment deployed on the second cloud provider in response to a request to migrate from the first computing environment to the second computing environment, the first set of instructions formatted according to the mapping and the snapshot including the first set of deployment APIs and the one or more resource files;
generating, by the one or more processors, a second set of instructions to deallocate the one or more resource files included in the snapshot from the first computing environment, the second set of instructions formatted according to the first set of deployment APIs; and
transmitting, by the one or more processors, the first set of instructions to the second cloud provider to allocate the one or more resource files to the second computing environment or the second set of instructions to deallocate the one or more resource files from the first computing environment.

\* \* \* \* \*